(12) United States Patent
Mishra et al.

(10) Patent No.: US 12,547,665 B2
(45) Date of Patent: *Feb. 10, 2026

(54) PERSONALIZED WHOLE SEARCH PAGE ORGANIZATION AND RELEVANCE

(71) Applicant: Microsoft Technology Licensing, LLC, Redmond, WA (US)

(72) Inventors: Abhineet Mishra, Bothell, WA (US); Venkata Madhu Sravanth Kurumaddali, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,349

(22) Filed: Sep. 12, 2022

(65) Prior Publication Data

US 2023/0004610 A1    Jan. 5, 2023

Related U.S. Application Data

(63) Continuation of application No. 16/044,112, filed on Jul. 24, 2018, now Pat. No. 11,442,999.

(51) Int. Cl.
*G06F 16/9535* (2019.01)
*G06F 16/2457* (2019.01)
(Continued)

(52) U.S. Cl.
CPC .... *G06F 16/9535* (2019.01); *G06F 16/24578* (2019.01); *G06F 16/9038* (2019.01); *G06N 20/00* (2019.01)

(58) Field of Classification Search
None
See application file for complete search history.

(56) References Cited

U.S. PATENT DOCUMENTS

| 8,650,173 | B2 | 2/2014 | McDonald et al. |
| 2003/0204515 | A1 | 10/2003 | Shadmon et al. |

(Continued)

FOREIGN PATENT DOCUMENTS

CN    102999560 A    3/2013

OTHER PUBLICATIONS

"Fleet Indexing Service", Retrieved from: http://web.archive.org/web/20171206154108/http://docs.aws.amazon.com/iot/latest/developerguide/iot-indexing.html, Dec. 6, 2017, 6 Pages.

(Continued)

*Primary Examiner* — Amresh Singh
(74) *Attorney, Agent, or Firm* — CALFEE, HALTER & GRISWOLD LLP

(57) ABSTRACT

Representative embodiments disclose mechanisms to assign search results associated with a user query to locations based in part on features associated with the user's Internet of Things (IoT) devices. This results in a search page that presents results in an order and prominence that improves user understanding and information accessibility. Features from IoT devices are used to train a machine learning model that receives as an input information from an IoT entity index, the query, and results from the search engine along with their static rankings. The resultant IoT positioning scores are used to assign an initial location on the search results page. A second machine learning model trained using IoT features is then used to assign a final location on the page. The system causes display of the page to the user.

20 Claims, 11 Drawing Sheets

(51) Int. Cl.
*G06F 16/9038* (2019.01)
*G06N 20/00* (2019.01)

(56) References Cited

U.S. PATENT DOCUMENTS

| | | |
|---|---|---|
| 2008/0005067 A1 | 1/2008 | Dumais et al. |
| 2008/0005068 A1 | 1/2008 | Dumais et al. |
| 2011/0246456 A1 | 10/2011 | Weitz et al. |
| 2014/0244610 A1 | 8/2014 | Raman et al. |
| 2014/0244834 A1 | 8/2014 | Guedalia et al. |
| 2015/0019342 A1 | 1/2015 | Gupta |
| 2015/0032717 A1 | 1/2015 | Cramer et al. |
| 2015/0161128 A1 | 6/2015 | Goel |
| 2015/0213138 A1 | 7/2015 | Lee et al. |
| 2015/0324454 A1 | 11/2015 | Roberts et al. |
| 2016/0117604 A1 | 4/2016 | Frosst |
| 2016/0179962 A1 | 6/2016 | Patten et al. |
| 2016/0203234 A1 | 7/2016 | Piccand et al. |
| 2017/0078875 A1 | 3/2017 | Muhanna et al. |
| 2017/0109794 A1 | 4/2017 | Smith et al. |
| 2017/0149928 A1 | 5/2017 | George et al. |
| 2017/0206250 A1 | 7/2017 | Loomans et al. |
| 2017/0286491 A1 | 10/2017 | Kaissi |
| 2018/0012153 A1 | 1/2018 | Hu et al. |
| 2018/0034824 A1 | 2/2018 | Maycotte et al. |
| 2018/0095967 A1 | 4/2018 | Kota |
| 2018/0307747 A1 | 10/2018 | Du et al. |
| 2019/0155934 A1 | 5/2019 | Delaney et al. |
| 2019/0295148 A1 | 9/2019 | Lefkow et al. |
| 2019/0318037 A1 | 10/2019 | Mishra et al. |
| 2019/0340202 A1 | 11/2019 | Kandur et al. |
| 2019/0347358 A1 | 11/2019 | Mishra et al. |
| 2019/0347560 A1 | 11/2019 | Jaiswal et al. |
| 2019/0370401 A1 | 12/2019 | Grant et al. |
| 2020/0034486 A1 | 1/2020 | Mishra et al. |

OTHER PUBLICATIONS

"What Is AWS IoT", Retrieved from: http://web.archive.org/web/20171206164445/http://docs.aws.amazon.com:80/iot/latest/developerguide/what-is-aws-iot.html, Dec. 6, 2017, 4 Pages.
"Office Action Issued in European Patent Application No. 19716721.6", Mailed Date: Jun. 29, 2022, 9 Pages.
"Evaluating Whole-Page Relevance", By Peter Bailey, et al. Microsoft Corporation, One Microsoft Way, Redmond, WA, 98052 USA, 2 pages.
"International Search Report and Written Opinion Issued in PCT Patent Application No. PCT/US2019/037847", Mailed Date: Aug. 21, 2019, 11 pages.
"Office Action for U.S. Appl. No. 16/044,112", Mailed Date: Apr. 16, 2020, 13 pages.
"Non Final Office Action Issued in U.S. Appl. No. 15/950,936", Mailed Date: Mar. 4, 2020, 12 Pages.
"International Search Report and Written Opinion Issued in PCT Application No. PCT/US2019/024189", Mailed Date: May 16, 2019, 17 Pages.
Rizzo, et al., "NERD: A Framework for Unifying Named Entity Recognition and Disambiguation Extraction Tools", In Proceedings of the 13th Conference of the European Chapter of the Association for Computational Linguistics, Apr. 23, 2012, pp. 73-76.
"Response to the Office Action for U.S. Appl. No. 16/044,112", Filed Date: Jul. 16, 2020, 13 pages.
"Final Office Action for U.S. Appl. No. 16/044,112", Mailed Date: Oct. 5, 2020, 14 pages.
"Response to the Final Office Action for U.S. Appl. No. 16/044,112", Filed Date: Jan. 5, 2021, 17 pages.
"Non-Final Office Action Issued in U.S. Appl. No. 15/950,936", Mailed Date: Mar. 17, 2021, 16 Pages.
"Final Office Action Issued in U.S. Appl. No. 15/950,936", Mailed Date: Oct. 1, 2020, 15 Pages.
"Notice of Allowance and Fees Due for U.S. Appl. No. 16/044,112", Mailed Date: Jun. 30, 2021, 14 pages.
"Corrected Notice of Allowability for U.S. Appl. No. 16/044,112", Mailed Date: Jul. 6, 2021, 11 pages.
"Final Office Action Issued in U.S. Appl. No. 15/950,936", Mailed Date: Oct. 5, 2021, 16 Pages.
"Office Action for U.S. Appl. No. 16/044,112", Mailed Date: Nov. 24, 2021, 14 pages.
"Non-Final Office Action Issued in U.S. Appl. No. 15/950,936", Mailed Date: Feb. 3, 2022, 17 Pages.
"Response to the Office Action for U.S. Appl. No. 16/044,112", Filed Date: Apr. 25, 2022, 18 pages.
"Notice of Allowance and Fees Due for U.S. Appl. No. 16/044,112", Mailed Date: May 4, 2022, 6 pages.
"Corrected Notice of Allowability for U.S. Appl. No. 16/044,112", Mailed Date: May 24, 2022, 3 pages.
"Corrected Notice of Allowability for U.S. Appl. No. 16/044,112", Mailed Date: Aug. 3, 2022, 3 pages.
"Office Action Issued in Indian Patent Application No. 202047037741", Mailed Date: Aug. 3, 2022, 7 Pages.
Notice of Allowance mailed on Dec. 18, 2023, in U.S. Appl. No. 15/950,936, 9 pages.
Notice of Allowance mailed on Apr. 29, 2024, in U.S. Appl. No. 15/950,936, 07 pages.
Office Action Received for Chinese Application No. 201980024982.9, mailed on Dec. 5, 2024, 2 pages. (English Translation not Provided).
Second Office Action Received for Chinese Application No. 201980024982.9, mailed on Jun. 22, 2024, 6 pages (English Translation Provided).
Notice of Allowance mailed on Apr. 18, 2024, in U.S. Appl. No. 15/950,936, 10 pages.
Office Action Received for Chinese Application No. 2019800249829, mailed on Jan. 26, 2024, 7 pages (English Translation Provided).
Zhou, et al., "The Research on Visual Exploratory Search Engine in Cloud Computing Environment", Journal of Jiangxi Normal University, vol. 39, No. 06, Nov. 15, 2015, 5 pages.
Second Office Action Received for Chinese Application No. 201980024982.9, mailed on Jun. 22, 2024, 4 pages (English Translation Provided).
Non-Final Office Action mailed on Jun. 11, 2025, in U.S. Appl. No. 18/768,953, 32 pages.
Intimation of Grant Received for Indian Application No. 202047037741, mailed on Nov. 6, 2025, 01 Page.
Notice of Allowance mailed on Dec. 15, 2025, in U.S. Appl. No. 18/768,953, 11 pages.

PERSONALIZED WHOLE SEARCH PAGE ORGANIZATION AND RELEVANCE

RELATED APPLICATION

This application is a continuation of U.S. patent application Ser. No. 16/044,112, filed on Jul. 24, 2018, and entitled "PERSONALIZED WHOLE SEARCH PAGE ORGANIZATION AND RELEVANCE," the entirety of which is incorporated herein by reference.

FIELD

This application relates generally to search systems. More specifically, in some aspects, this application relates to organization and relevance of whole page search results.

BACKGROUND

Modern web search engines aggregate search results from different verticals such as web pages, news, images, video, and so forth. These results are typically ranked through several layers of static rankers and placed on the search results page according to the associated rank.

It is within this context that the present embodiments arise.

DETAILED DESCRIPTION

Figure 1:
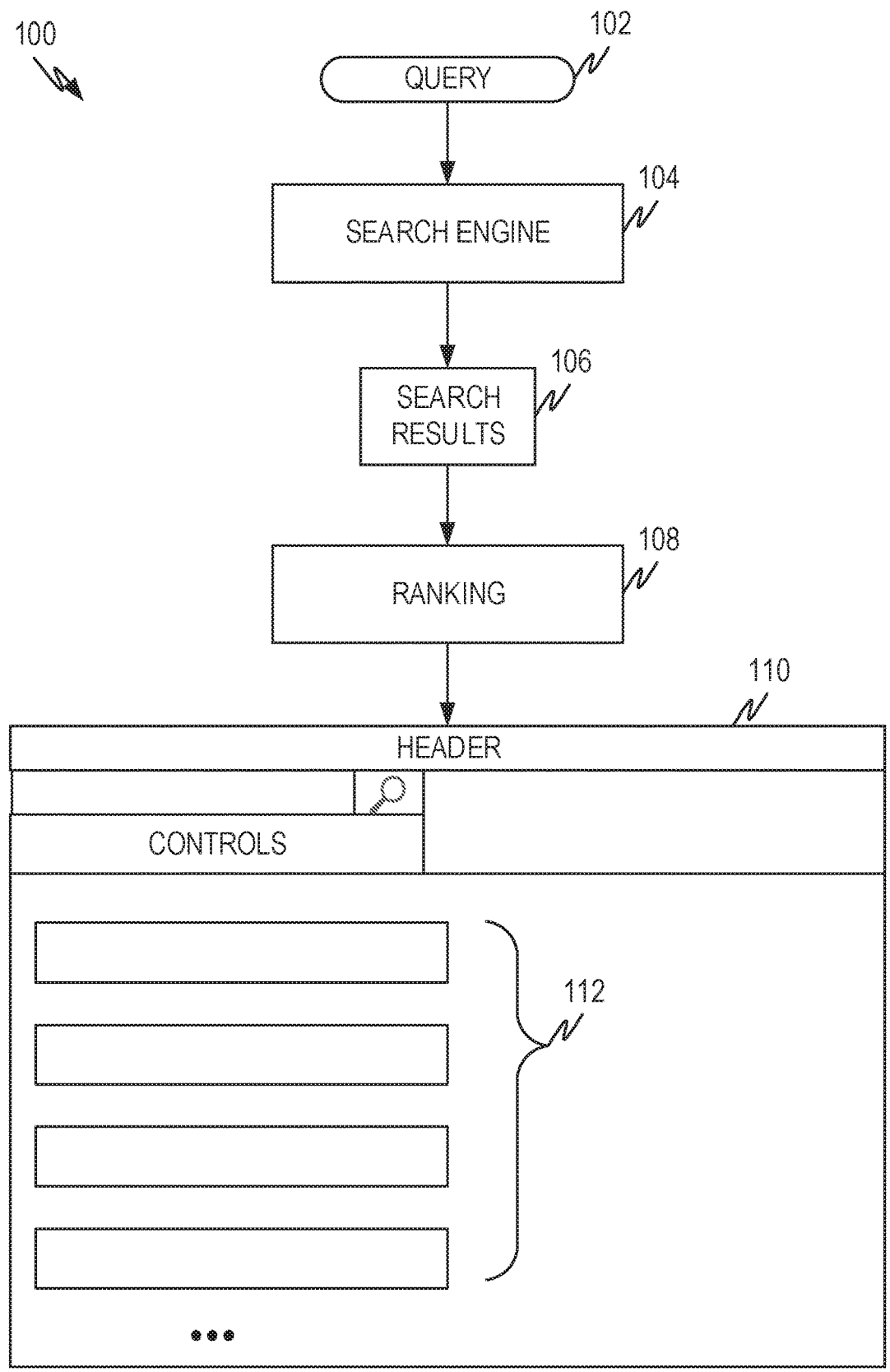
FIG. 1 is a representative diagram illustrating a prior art method of organizing search results on a search engine results page.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

OVERVIEW

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

In prior systems, results from a user entered query were put through several layers of static ranking to produce an ordered list of results that a user could scroll through looking for the desired information. More modern systems aggregate results from several different types of data such as web pages, news, video, shopping, maps, and so forth. The results are placed on the search results page in a manner that attempts to improve the whole page relevance of the results presented to a user. Whole page relevance defines how well the surface-level representation (e.g., format, size, relative location, and so forth) of all elements on a search result page and the corresponding holistic attributes of the presentation respond to users' information needs.

Improving whole page relevance is more than simply a better way to present information. Improving whole page relevance allows a user to access relevant information in a more efficient manner. Improving whole page relevance presents information that is more likely to be relevant in a location and in a fashion that allows a user to not only quickly locate desired information but to quickly recognize the desired information. Improving whole page relevance is a technical improvement to the search engine because it improves the efficiency of using the device by bringing together more relevant information and presenting the information in a manner and/or location that allows a user to quickly find and recognize desired information.

Embodiments of the present disclosure improve whole page relevance by using information from and/or about a user's Internet of Things (IoT) devices to improve ranking and/or positioning of search results on the search results page prior to displaying the user. IoT devices include devices that a user owns or interacts with and that are becoming computerized and that are able to communicate over networks and/or collect data such as cars, refrigerators, furnaces, wearables, medical devices, and so forth. The user may interact with and/or be associated with many IoT devices without even being aware of it.

Data from and/or about a user's IoT devices can be collected, rationalized, and conflated with one or more search knowledge indexes to create an IoT entity index that can be used as described herein to improve whole page relevance. Data is collected and used with user consent to improve the efficiency with which a user interacts with the system.

A user submits a search query to a search system. The search system produces a set of results that are relevant to the query. The results are ranked using one or more static rankers to produce a set of results, each having an associated static rank. An enhanced IoT ranker having a trained machine learning model then assigns a placement score to each of the results. The machine learning model is trained using features from and/or about the IoT devices. During the enhanced IoT ranking process, features from the IoT entity index are used in conjunction with the query and the static ranking of the answer to assign placement scores.

A positioner assigns initial page placement positions on the results page based on the position scores. An answer classifier assigns final page positions using another trained machine learning model. The system then causes display of the search results to the user.

DESCRIPTION

FIG. 1 is a representative diagram 100 illustrating a prior art method of organizing search results on a search engine results page. A query 102 is submitted to a search engine 104. Using traditional methods, the search engine identifies results 106 that are deemed relevant to the query. The results are then ranked through several layers of static rankers 108 to arrive at a final ranked list of search results. The final list is placed in rank order and are returned as a list of results 112 on a search results page 110.

A user is then left to page through pages of results until the desired result(s) are located. In such a prior art approach, there is no attempt to optimize the placement of results beyond the static ranking and the placement of results in rank order. Thus, this approach is not attempting to increase or even consider the whole page relevance of the search results page. In addition, all results of different types (web results, video, image, and so forth) are ranked together in the same list.

Figure 2:
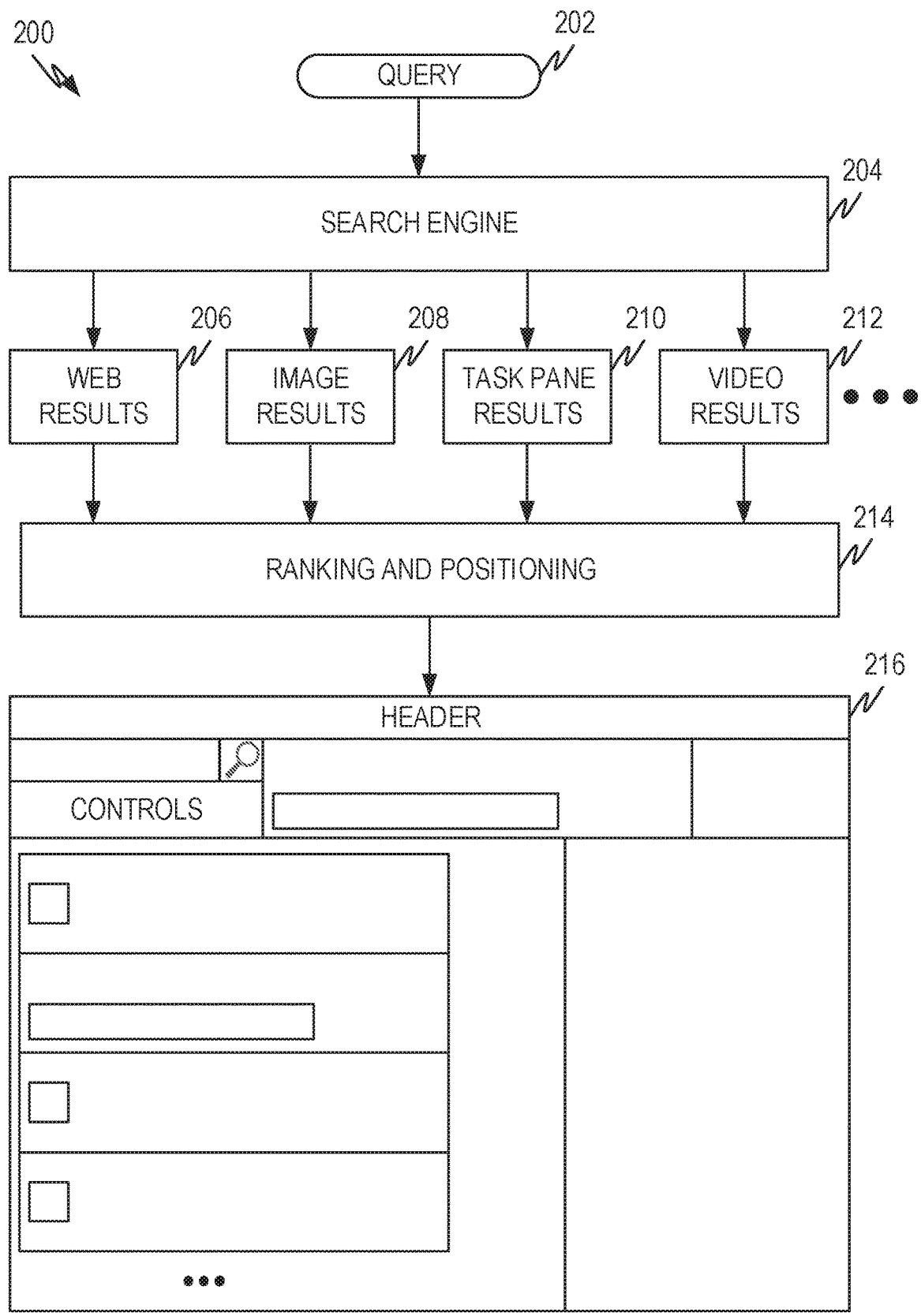
FIG. 2 is a representative diagram illustrating a representative architecture of ranking and positioning search results according to some aspects of the present disclosure.

FIG. 2 is a representative diagram illustrating a representative architecture 200 of ranking and positioning search results according to some aspects of the present disclosure. This architecture represents a high-level diagram of architectures that are described in greater detail below.

In this architecture, a user submits a query 202 to a search engine 204. The search engine uses subqueries and/or other mechanisms to identify results of different types that are relevant to the query, such as web results 206, image results 208, task pane results 210, video results 212, and so forth as indicated by the illustrated ellipses. All these types should be self-explanatory except for maybe the task pane results. Task pane results are results that are typically placed in a region of the output screen (the task pane) that remains relatively constant in terms of location but whose content in terms of type and existence is dependent on the user query and/or user context. Thus, for one query the task pane may not be used, for another the task pane may contain one type of data, and for yet another query a different mix of types of data.

The ranking and positioning engine 214 takes the different type of search results that have been determined to be relevant to the query by the search engine and ranks them and determines where to place them on the search results page 216. The ranking and positioning engine 214 utilizes one or more trained machine learning models to perform ranking and positioning as described in greater detail below. The machine learning models are trained using features of IoT devices so that ranking and positioning increases the whole page relevance of the search results page 216. A representative training process is described below.

The resultant search results page 216 has improved whole page relevance due to using IoT entity index data as described herein.

Figure 3:
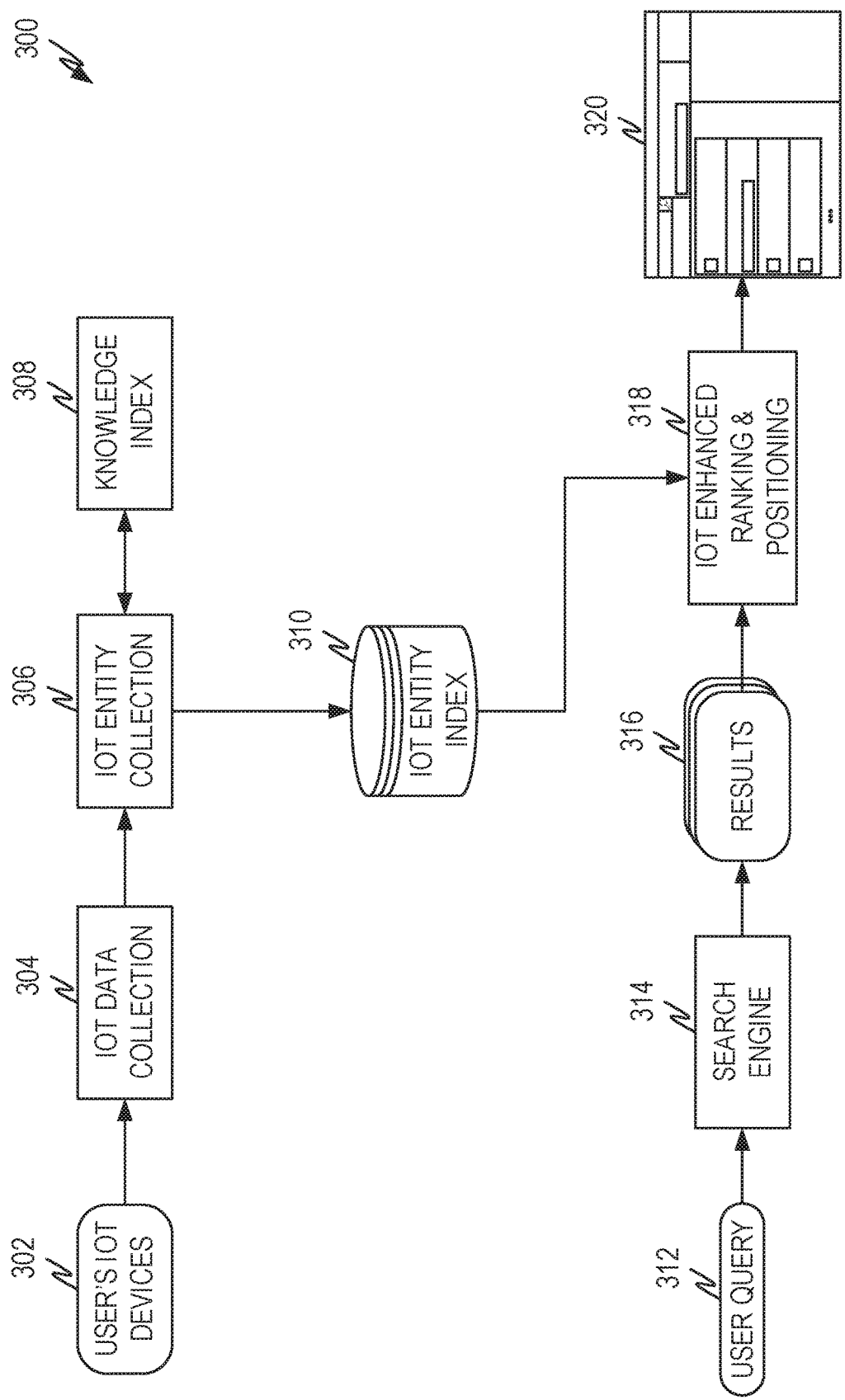
FIG. 3 is a representative diagram illustrating another representative architecture of ranking and positioning search results according to some aspects of the present disclosure.

FIG. 3 is a representative diagram illustrating another representative architecture 300 of ranking and positioning search results according to some aspects of the present disclosure. The architecture 300 utilizes information about or from users' IoT devices 302. These IoT devices are associated with various users and data is collected on a per user basis in many embodiments with users' permission and knowledge. As previously discussed, IoT devices 302 can comprise any devices that a user interacts with, owns, or otherwise utilizes.

Often IoT devices are thought of in a one-to-one relationship between items and IoT devices (e.g., a car is a single IoT device). However, a single item could include multiple IoT devices. For instance, a car could have an IoT device for its electrical system, an IoT device for its emission system, an IoT device for its fuel system, and so forth. Thus, a real-world implementation may include billions of IoT devices associated with millions of users and architecture 300 is configured to handle such an implementation.

Architecture 300 can include and/or communicate with an IoT data collector 304, an IoT entity collector 306, a knowledge graph or index 308, an IoT entity index 310, a search engine 314, and/or an IoT enhanced ranking and positioning engine 318. In this example, the IoT data collector 304, and/or IoT entity collector 306 can be part of a system which collects data about and from IoT devices and produces the IoT entity index 310 or can be part of a search system.

IoT data collector 304 can be viewed as a central hub where sensor data from users' IoT devices 302 and or information about a user's IoT devices 302 is communicated. For instance, in an example where a user's IoT devices included a refrigerator and a car, the IoT data 302 could include "Whirlpool ABC" at 304, where "ABC" is a contrived model of refrigerator. The IoT data could also includes "Honda Civic" at 304. For sake of brevity the amount of IoT device data in the illustrated example is relatively brief. However, more extensive IoT device information could be conveyed. For instance, relative to the Honda, the IoT device data could include mileage, status of various systems, percent of oil life remaining, next projected service, and so forth. The IoT data collector can associate the IoT data with a particular user, with the user's informed consent. For example, the IoT collector could associate User1 with both the "Whirlpool ABC" and the "Honda Civic".

In some cases, a client component (not specifically illustrated) can run on the IoT devices 302 and can collect information from the IoT device. The client component can send the information to the IoT data collector 304. In some of these configurations, the client component can include a push-based notification agent. The push-based notification agent can detect changes in the state of the IoT device and/or new data to transfer and push the information to the IoT data collector 304. The type of information about the IoT device and/or how often information changes can vary based upon device type and/or environment. For instance, a car parked in a garage may send less data and/or send the data less frequently than a car driving down the road.

Collecting a user's IoT data can implicate certain privacy issues. Thus, such data can be collected with the user's informed consent. Furthermore, embodiments of the disclosure can allow the user to customize parameters such as what data is collected, what devices the data is collected from, how long the data is utilized, and so forth. For example, the user may allow collection of information from the user's car, but not from the user's wearable device, or allow collection of the make and model of the wearable device but not location or health data.

Allowing the user to customize data collection gives the user control of the IoT enhanced ranking and positioning since, as described herein, the data drives how the ranking and positioning operates. Thus, the data customization translates into a system customization by the user.

Although IoT data is collected by the IoT data collector, the IoT device data may not be in a form that is recognized and/or useful in a search context. Stated another way, the IoT device data may not have any value in a search context. From one perspective, the discussion that follows explains techniques for increasing the value of the IoT device data in the search context. From another perspective, one technical problem is that IoT data does not currently exist in a manner that is understood in the highly developed search context. The discussion below provides a technical solution to this problem.

IoT entity collector 306 extracts and processes the data from IoT data collector 304. The extraction and processing can entail multiple stages. For instance, one stage can process and ingest the IoT device data and place the data into an intermediate store. Another stage can include integration of all IoT device data across different IoT applications and/or sources to draw correlations. Another stage can entail periodically reading IoT device data from the intermediate store and store it in distributed storage. Another stage can entail deserializing the IoT device data and converting the IoT data into an indexable data format.

In some implementations, the IoT entity collector 306 can analyze the IoT device data relative to entity and popularity indexes. Stated another way, this analysis can identify entities in the IoT device data. For instance, the IoT entity collector 306 can extract entity names from the IoT device data by finding matches between the IoT device data and one or more entity indexes. The IoT entity collector can also employ a popularity index relative to the IoT device data. For example, the popularity index can be populated with various entity information relating to frequency of usage, duration of usage, last time use, novelty factor, and/or brand of entity, among others. For instance, one manifestation of the popularity index can include a weighted mean of these facets. Thus, once the IoT entity collector 306 identifies an entity in the IoT device data, the IoT entity collector 306 can identify how often that entity is accessed, and so forth (e.g., what entities does the IoT device data relate to and how interested is the user in individual entities).

IoT entity collector 306 can utilize knowledge index 308 to derive additional information about the IoT device data. For instance, IoT entities from the IoT device data can be compared to the knowledge index 308. Various knowledge indexes can be employed. Search engine knowledge indexes are available, for example from search services and/or search engines 314. The process can compare entities of the IoT device data to entities of the knowledge index 308. If an entity match is found, the existing entity ID and metadata from the knowledge index can be utilized by the IoT entity collector 306. In an alternative case where the entity is not found, the new IoT entity from the IoT device data can added to the knowledge index 308 for future use.

IoT entity collector 306 can also identify related entities (such as parent and/or child relationships (e.g., ontological relationships)) and metadata associated with the IoT entity using N step graph traversal over the knowledge graph 308.

Thus, in the illustrated example, the IoT entity collector 306 obtains additional information relative to the IoT device data from the IoT data collector 304. This additional information can be viewed as structured IoT device data (e.g., the IoT device data is augmented with information about the IoT device data from knowledge index 308).

The structured IoT device data can be compared to the IoT device data from IoT data collector 304 for purposes of explanation. Using the refrigerator and car above as illustrative, the additional information can specify that "Whirlpool" is an entity of entity type "refrigerator," and "ABC" is a model of Whirlpool refrigerator. Similarly, the additional information can specify that "Honda" is an entity of entity type "car," and "Civic" is a model of Honda car. Some of this information was in the IoT device data. For instance, "Honda" was in the IoT device data, but without context. The knowledge index 308 provided information that "Honda" is an entity. Other information was not in the IoT device data and was derived from the knowledge graph. For instance, the information that the entity "Honda" has a child relationship to parent entity type of car was derived from the knowledge graph and added to the structured IoT device data. Thus, from one perspective, the structured IoT device data can add context to the IoT device data that makes the structured IoT device data useful or meaningful in the search context.

Figure 4:
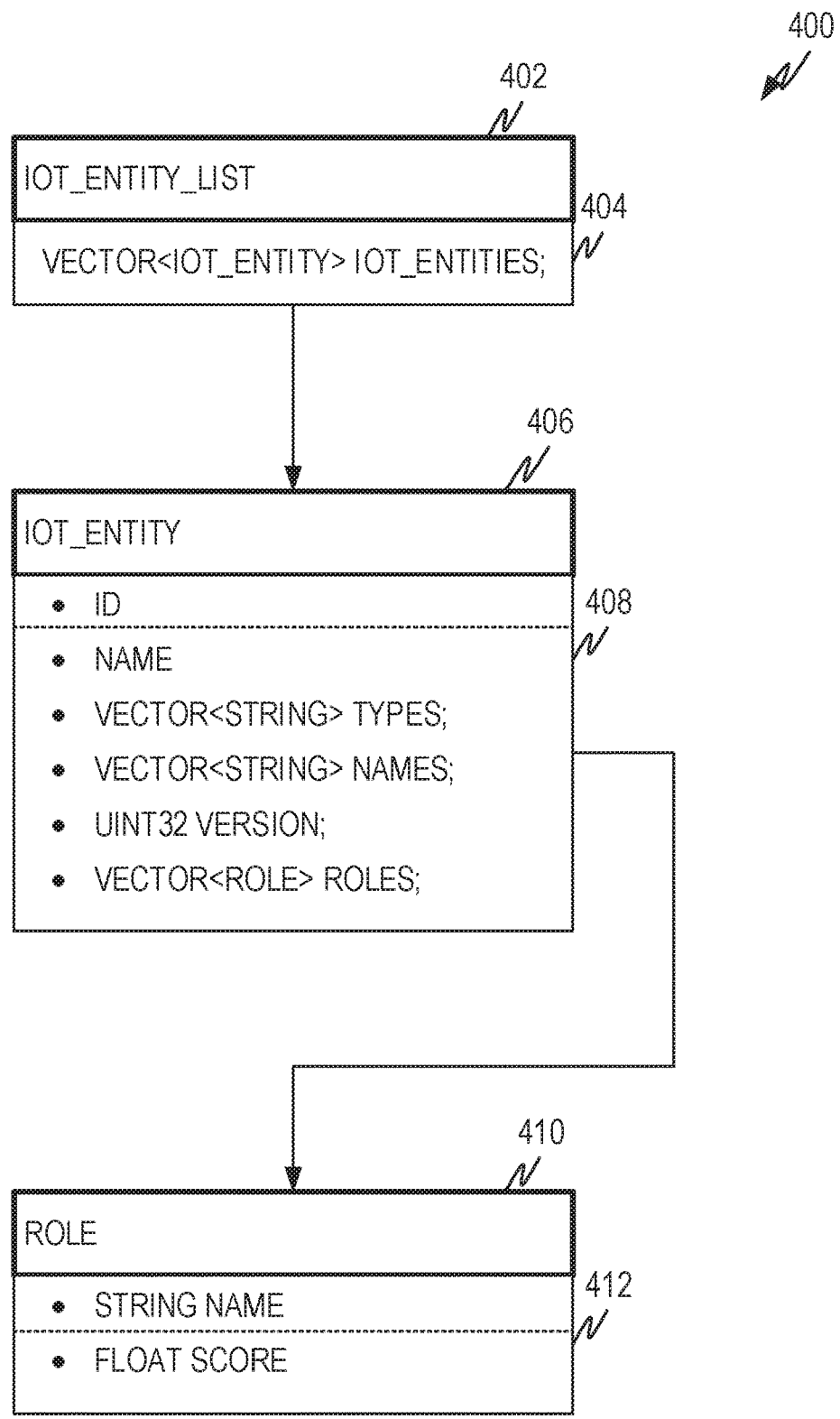
FIG. 4 is a representative diagram illustrating a schema for Internet of Things data.

The structured IoT device data can be added to the IoT entity index 310. For instance, in some implementations, the identified entities can be ingested into the IoT entity index 310 with several fields, such as user ID, entity ID, popularity index, etc. In this case, a user ID can be an anonymous unique identifier for the user. The entity ID can be the search engine knowledge base unique ID. The popularity index can be a score of relevance which is a measure of trending interest (e.g., relative trending popularity), virality, and/or usefulness. In some implementations, the structured IoT device data can be converted into an indexable data format for the IoT entity index 310. FIG. 4 shows an IoT entity schema for this conversion.

Figure 5:
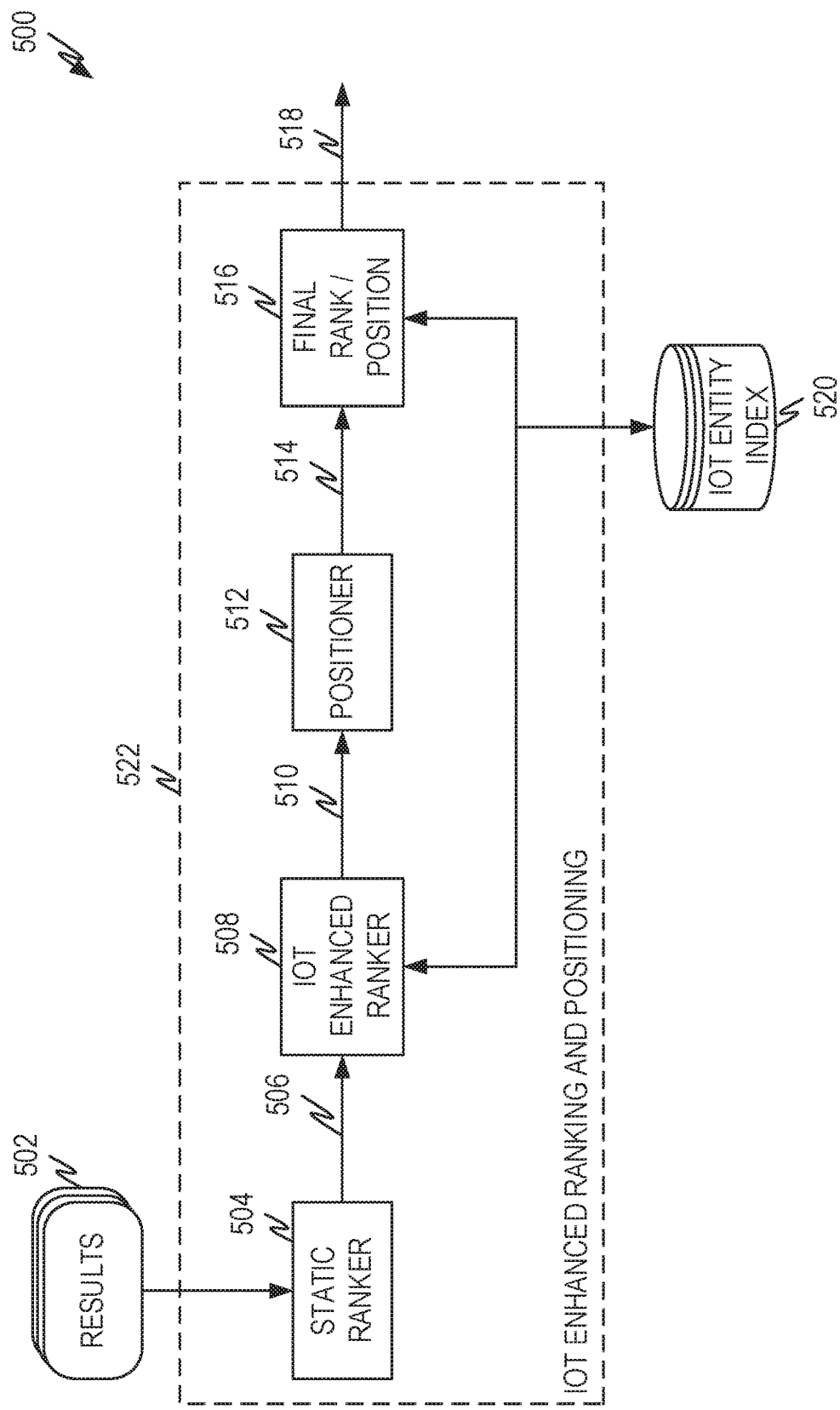
FIG. 5 is a representative diagram illustrating a representative architecture of an Internet of Things enhanced ranker and positioner according to some aspects of the present disclosure.

The discussion of FIG. 5 above that culminates with the IoT entity index 310 explains one strategy for making users' IoT device data useful in a search context (e.g., as structured IoT device data stored in a format that allows search and retrieval). The remaining discussion relating to FIG. 5 explains examples for employing the structured IoT device data in a constructive way to increase whole page relevance. In this example, the user submits the query to a search engine 314 or other search tool. The search engine 314 can provide a set of results 316 (e.g., documents, images, videos, etc.) which are relevant (e.g., contain terms of the query and/or have otherwise been identified as relevant). This aspect is known and as such is not discussed in detail here.

The results are presented to an IoT enhanced ranker and positioner 318. As explained in greater detail below, the IoT enhanced ranker and positioner 318 utilizes one or more trained machine learning models, the query, and/or the information from the IoT entity index 310 to identify specific relevance and place search results on the search results page 320 to increase the whole page relevance as explained in greater detail herein.

FIG. 4 is a representative diagram illustrating an entity schema 400 for IoT data. The IoT entity schema can provide a technique for converting the structured IoT device data described above into indexable data format for the IoT entity index (e.g., 310, 520, 608, 1008). The indexable data format can relate to entities in an IoT entity list 402, to properties or attributes of the entities at 406, and/or roles of the entities at 410.

In one case, the IoT entity schema 400 can be employed in an index build environment for the IoT entity index. In the index build environment, the generated indexable data format can be processed into the index and content chunks that can be consumed by the IoT entity index. An index as a service environment can download (e.g., stream) the chunk files generated by the index build as they are available. Periodically, the IoT entity feeds index can begin a merge process. During index merge, the index chunk files can be combined into a new, complete version of the IoT entity feeds index.

FIG. 5 is a representative diagram illustrating a representative architecture 500 of an Internet of Things enhanced ranker and positioner according to some aspects of the present disclosure. In response to a user query, a search engine identifies a set of results 502 that are relevant to the query. In some embodiments, these results comprise results of different types (web results, video, audio, image, task pane, and so forth as described). The results can be kept as groups of separate search result types.

The groups of search results are ranked using a static ranker 504 to assign a static rank score to at least a subset of results in the group. The static ranker 504 utilizes one or more layers of ranking to rank the results of the groups. These layers typically use heuristics and other methods that are developed offline. The static ranking can be performed using the static rankers typically used by search engines to rank results. In some embodiments, the static ranking can be part of the search engine.

The output 506 of the static ranker 504 is a subset (e.g., all or less than all) of results in each group, each result having an associated static rank, also referred to as a static score. In other words, in some embodiments the static ranker may drop some results out of a group.

The output 506 of the static ranker 504 is presented to an enhanced IoT ranker 508, along with the input query in some embodiments. The enhanced IoT ranker 508 assigns an initial positioning score (also referred to as an enhanced IoT rank or enhanced IoT score) based on IoT features from the IoT entity index 520. Thus, the output 510 of the enhanced IoT ranker 508 is a subset of results that have associated initial positioning scores that account for IoT features. At this point in the process the group of results can be kept separate in groups according to result type, or the results in one or more groups can be merged, or a combination thereof.

The initial ranking scores are then used by a positioner 512 to assign initial positions on a search results page to at least a subset of results. Thus, the output 514 of the positioner 512 are results that have been assigned to locations on the search results page. Not all results may be assigned a position on the search results page. Thus, some results can be dropped by the positioner 512. The positioner can account for the different regions on the search results page where results are to be assigned. Other criteria can be used to assign results to a location on a search page. For example, one region of a search results page may be reserved for a particular type of results (e.g., image results) and the results (e.g., images) can be assigned to a location in the region by positioning score (e.g., highest scores on the left).

The output 514 of the positioner 512 can be sent to a result experience classifier 516 for final ranking and positioning. The classifier 516 can help position the results within regions of the search results page based on classifications informed by features from the IoT entity index 520. Thus, the enhanced IoT ranker can assign scores that place the results generally on the page (e.g., top, middle top, bottom, etc.) and the classifier can place them in final locations based on a classification, grouping similar classifications together where appropriate. The output 518 can go to a compositor or other component or system that creates the search results page and sends it to a device for display to the user. Thus, the IoT enhanced ranker and positioner can cause display of the search results to the user.

Figure 6:
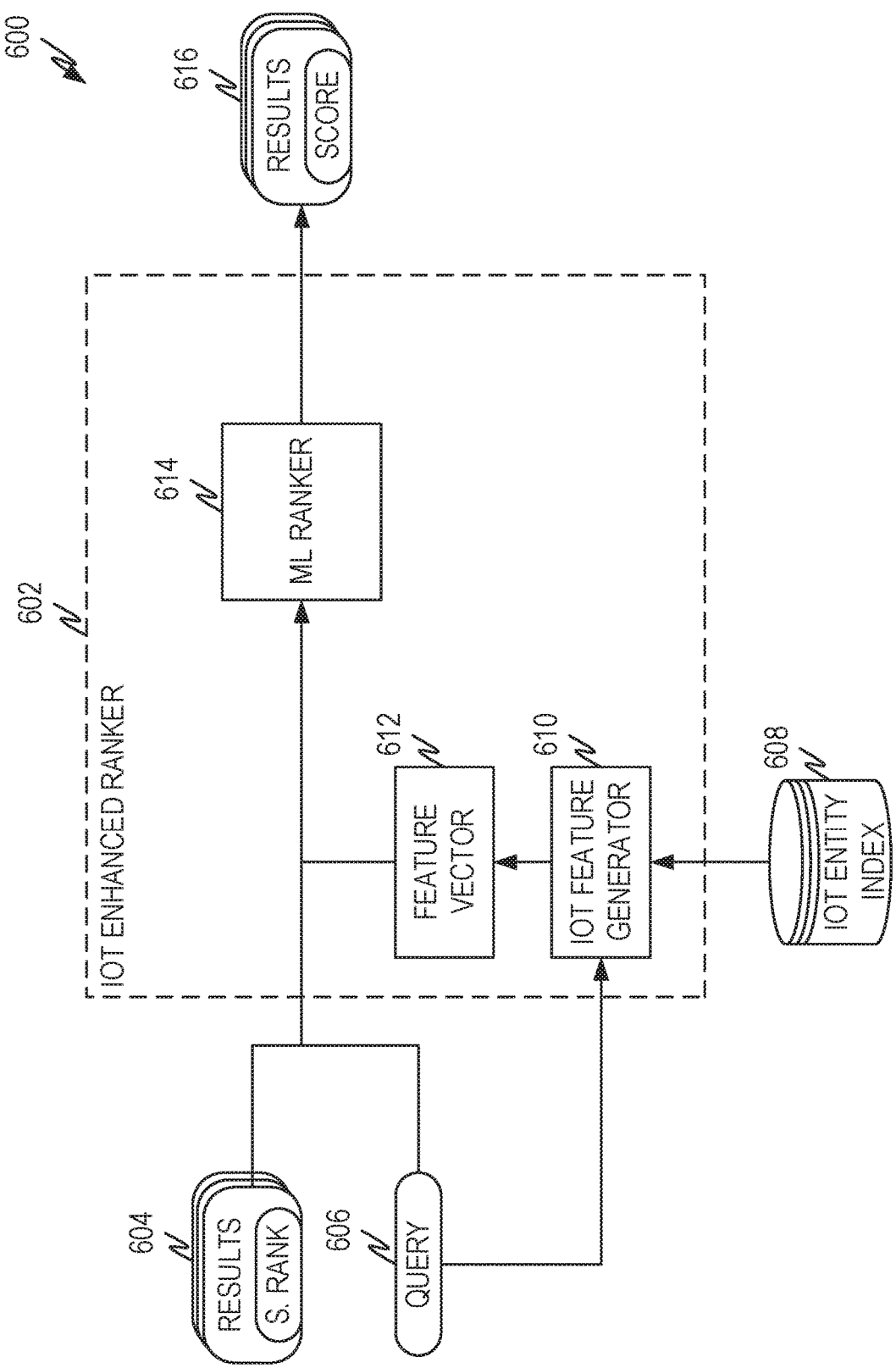
FIG. 6 is a representative diagram illustrating a representative architecture of an Internet of Things enhanced ranker according to some aspects of the present disclosure.

FIG. 6 is a representative diagram illustrating a representative architecture 600 of an IoT enhanced ranker according to some aspects of the present disclosure. This can be the same as the enhanced IoT ranker 508 of FIG. 5.

The IoT enhanced ranker 602 receives as inputs the search results along with their respective static rank score 604 and the input query 606. An IoT feature generator 610 uses a trained machine learning model to identify relevant features and to create a feature vector 612 for each search result. The feature vector 612 comprises feature values extracted from the IoT index 608 that will be used to determine the positioning score that will be generated by the machine learning ranker 614. An offline training process trains a machine learning model in IoT feature generator 610 to identify the appropriate features for the feature vector based on the query 606. The result and/or query can then be used to extract the associated feature values from the IoT entity index 608 to create the feature vector 612 for the corresponding result.

As an example, if the query relates to lighting, the features identified by the IoT feature generator 610 can include features related to IoT devices that have a relationship to lighting such as brands and types of smart lighting equipment owned by the user, install date for those items having a lifespan such as light bulbs, current state of the items, and so forth. Then feature values can be extracted from the IoT index 608 as appropriate to make the feature vectors for the results.

The results, their associated static rank scores and feature vectors and in some embodiments are presented to a ranker that employs a trained machine learning model 614 to determine an initial positioning score for the results 616. The feature score is a numeric value in some embodiments, as explained herein.

Figure 7:
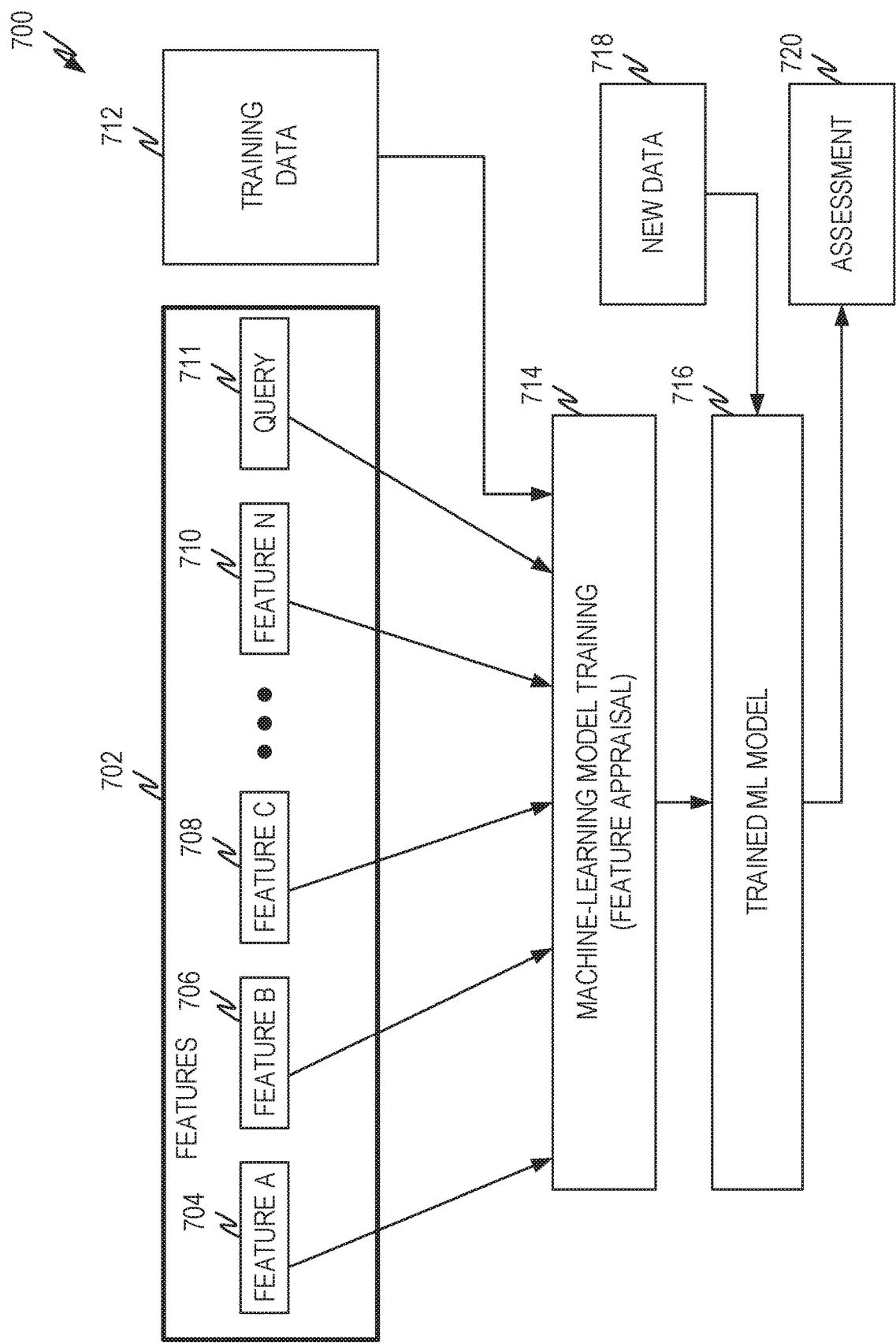
FIG. 7 is a representative diagram illustrating a representative method for training machine learning methods according to some aspects of the present disclosure.

FIG. 7 is a representative diagram illustrating a representative method 700 for training machine learning methods according to some aspects of the present disclosure. There are several trained machine learning models used in embodiments of the present disclosure. They can be trained using a similar methodology, but with different data and/or with different desired outputs. In some example embodiments, trained machine learning models, also referred to as machine-learning algorithms or tools, are utilized to perform operations associated with feature generation, ranking, position score determination, and other functions.

Machine learning is a field of study that gives computers the ability to learn without being explicitly programmed. Machine learning explores the study and construction of algorithms, also referred to herein as models or tools, that may learn from existing data and make predictions about new data. Such machine-learning tools operate by building a model from example training data 712 in order to make data-driven predictions or decisions expressed as outputs or assessments 720. Although example embodiments are presented with respect to a few machine-learning models, the principles presented herein may be applied to other machine-learning models.

In some example embodiments, different machine-learning models may be used. For example, Logistic Regression (LR), Naive-Bayes, Random Forest (RF), neural networks (NN), matrix factorization, and Support Vector Machines (SVM) tools may be used for feature generation, score calculation, and other functions.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a numerical value). In some embodiments, example machine-learning models provide a positioning score (e.g., a numeric) to identify where results should be placed on a search results page to improve the whole page relevance. The machine-learning models utilize the training data 712 to find correlations among identified features 702 that affect the outcome.

The machine-learning models utilize features 702 for analyzing the data to generate assessments 720. A feature 702 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 702 may be of different types of things that are about and/or are from IoT devices. These are labeled as feature A 704, feature B 706, feature C 708, and feature N 710. These features can be IoT device information such as those listed in the schema illustrated in FIG. 4. Additionally, these feature can include other information such as the popularity of an IoT device, a measure of importance of an IoT device, and so forth. Other information can also be used as features such as the query, the static rank for a result, the associated result, information about the result, and/or any other information that will be input into the trained machine learning model. As an example, when the function of the machine learning model is to select IoT features that will be input into another machine learning model (e.g., IoT features generator 610), then the query will be a feature used in training.

The machine-learning models utilize the training data 712 to find correlations among the identified features 702 that affect the outcome or assessment 720. In some example embodiments, the training data 712 includes labeled data (also referred to as annotated data), which is known data for one or more identified features 702 and one or more outcomes, such as selecting features for use in a feature vector, calculating placement scores, and so forth.

With the training data 712 and the identified features 702, the machine-learning model is trained at operation 714. The machine-learning model appraises the value of the features 702 as they correlate to the training data 712 and adjusts model parameter values according to an error function until the model converges. The result of the training is the trained machine-learning model 716.

When the trained machine-learning model 716 is used to perform an assessment, new data 718 is provided as an input to the trained machine-learning model 716, and the trained machine-learning model 716 generates the assessment 720 as output. For example, when a result is assigned an initial placement score, the machine-learning model utilizes the result, the static rank score, the query, and the IoT feature vector to determine the initial placement score.

Figure 8:
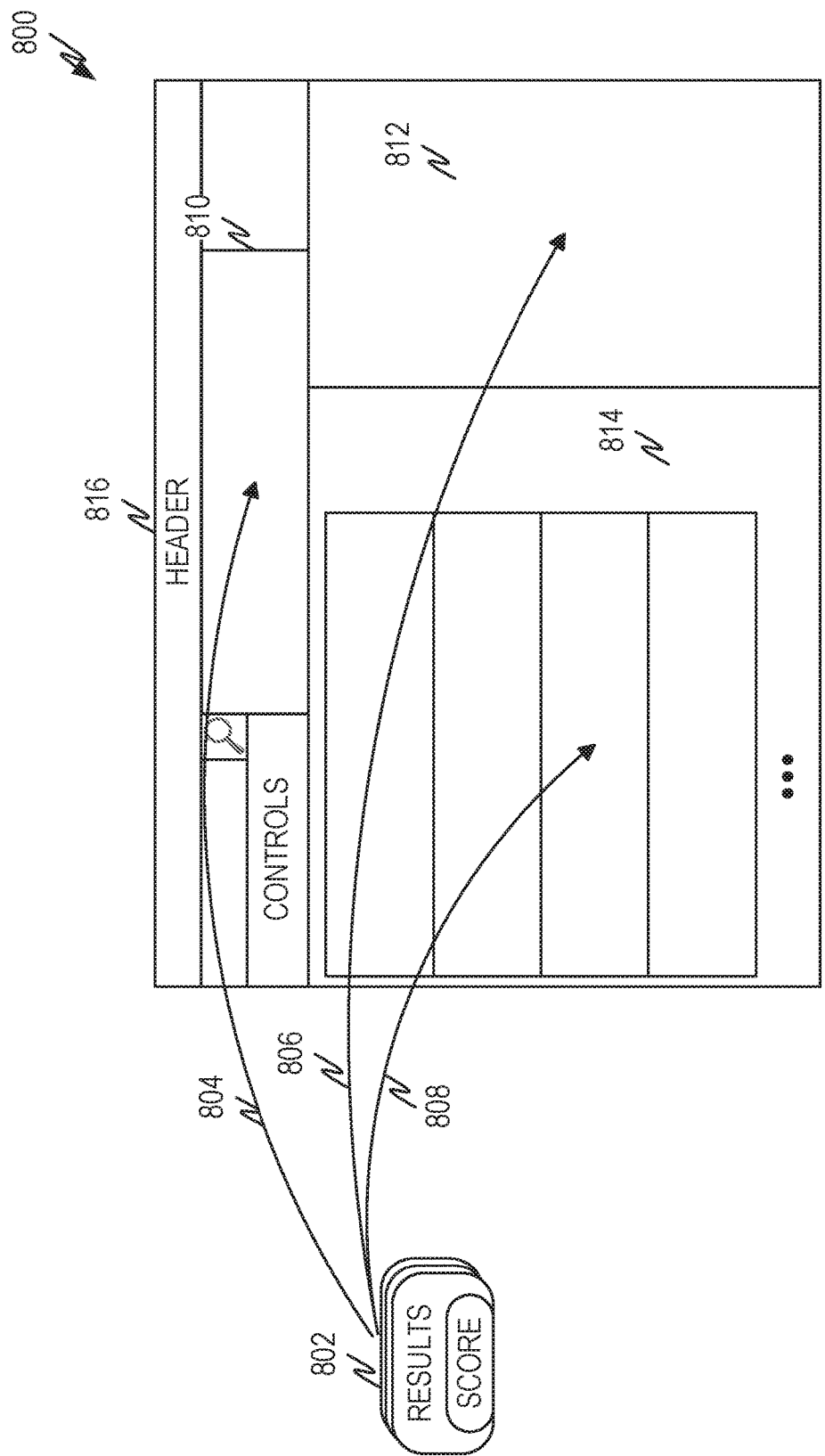
FIG. 8 is a representative diagram illustrating positioning ranked search results on a search engine results page according to some aspects of the present disclosure.

FIG. 8 is a representative diagram 800 illustrating positioning ranked search results 802 on a search engine results page 816 according to some aspects of the present disclosure. The positioner (e.g., 512) assigns initial locations on the search results page 816 by performing a mapping between initial position score and locations on the search results page 816. This can be performed via a trained machine learning model or by an implemented method, such as using executable instructions on a processor.

To illustrate what happens in this mapping, various regions of the search results page are assigned ranges of scores. Thus, region 810 may be assigned one range of scores, region 812 may be assigned another range of scores, and region 814 may be assigned another range of scores. Score ranges can have a lower bound (e.g., score>x), an upper bound (e.g., score<y), or both (w≤score<z). An initial placement score 802 are examined and compared to the regions and the corresponding result is sent to the proper region as indicated by 804, 806, and 808.

In one embodiment, score ranges and corresponding positions are given in Table 1.

TABLE 1

Score vs. Position

| Score | Position |
|---|---|
| ≥51 | Pole Position |
| ≥10 and <11 | Top of Page |
| ≥9 and <10 | Middle of Page 1 |
| ≥8 and <9 | Middle of Page 2 |
| ≥0 and <1 | Bottom of Page |
| <0 | Suppressed |
| −1000 | Not enough information to do IoT Enhanced ranking-use static rank instead |

In Table 1, the trained machine learning model which produces the scores does not provide scores between 11 and 50 and thus the table does not need to account for them. These scores can be reserved for positions on the search results page that may be used at some future date.

Figure 9:
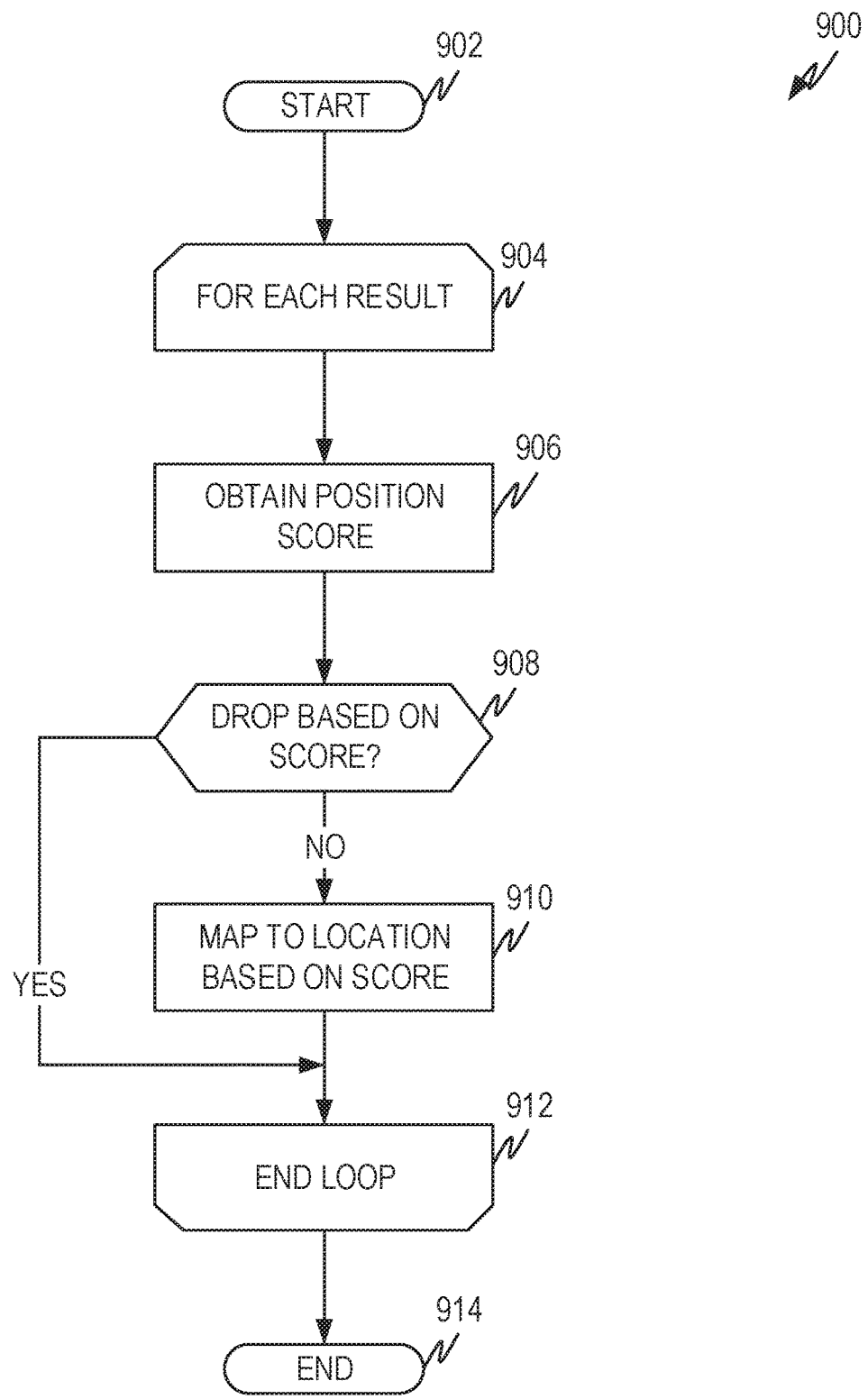
FIG. 9 is a representative a flow diagram for positioning ranked search results on a search engine results page according to some aspects of the present disclosure.

FIG. 9 is a representative a flow diagram 900 for positioning ranked search results on a search engine results page according to some aspects of the present disclosure. This diagram represents a method that can be implemented using executable instructions on a processor. If a machine learning model is used instead, the model can be trained as previously described.

The method begins at operation 902 and proceeds to operation 904, which begins a loop for all results. Operation 906 obtains the position score for the result under consideration. Operation 908 tests whether the result should be suppressed based on the score. If so, the next result is selected for consideration and execution loops back (operation 912) to operation 906. If not, the result is mapped to the appropriate location in operation 910. As indicated in Table 1, if there was not enough information to assign a preliminary position score by the IoT enhanced ranker, then the position may be assigned based on the static rank score.

Once all results have been considered, the method ends at 914.

Figure 10:
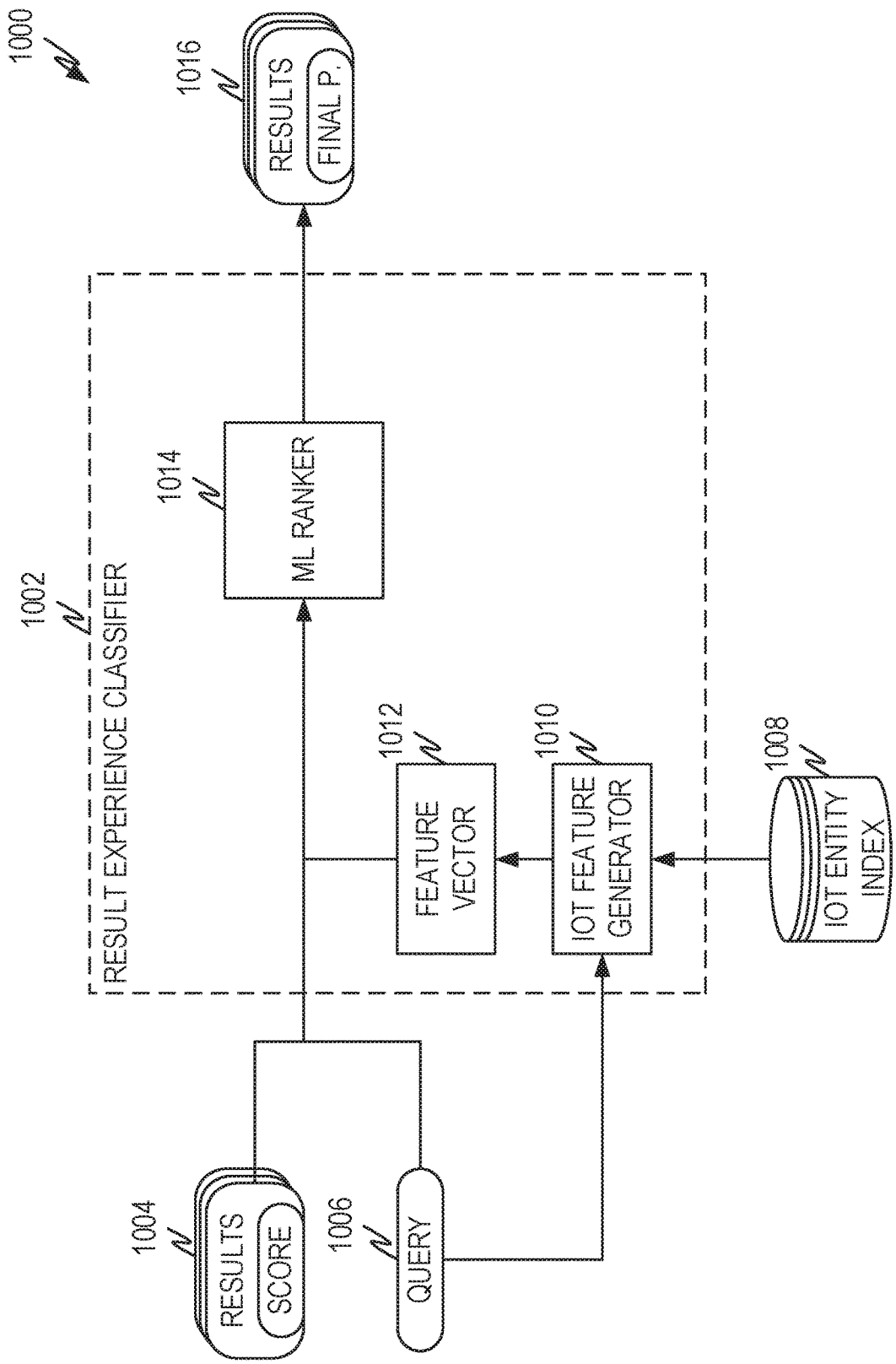
FIG. 10 is a representative architecture diagram for final ranking and positioning of search results on a search engine results page according to some aspects of the present disclosure.

FIG. 10 is a representative architecture 1000 diagram for final ranking and positioning of search results on a search engine results page according to some aspects of the present disclosure. Not all embodiments need utilize the architecture of FIG. 10.

The architecture 1000 illustrates one representative implementation of a result experience classifier (e.g., 5160 for final ranking and positioning. The classifier 1002 can help position the results within regions of the search results page based on classifications informed by features from the IoT entity index 1008. Thus, the IoT enhanced ranker can assign scores that place the results generally on the page (e.g., top, middle top, bottom, etc.) and the classifier can place them in final locations based on a classification, grouping similar classifications together where appropriate. The output 1006 can go to a compositor or other component or system that creates the search results page and sends it to a device for display to the user. Thus, the IoT enhanced ranker and positioner can cause display of the search results to the user.

The implementation or the result experience classifier 1002 is similar to the implementation of the IoT enhanced ranker described in FIG. 6. However, the machine learning models are trained to produce different outputs. Stated another way, while the IoT enhanced ranker 602 is designed to produce initial positioning scores, the result experience classifier is designed to produce final positionings.

The IoT feature generator 1010 evaluates the query and selects features that should be used for the feature vectors 1012 using a trained machine learning model. The feature vectors 1012 are then created by extracting feature values from the IoT entity index 1008. The machine learning ranker 1014 utilizes the results with their initial position scores 1004, the query 1006, the feature vectors 1012 to create the final positions of the results 1016. The system causes the results to be presented as described.

Using the IoT data to enhance the positioning and presentation of search results causes an increase in the whole page relevance and thus improves the search system. An example will help illustrate this improvement. Suppose a user is looking for somewhere to get her car serviced. The user enters the query "car servicing." Without incorporating the disclosed embodiments, the search service will select results that are relevant to the query. These may include paid advertisements for places to get a car serviced, buy car parts, and so forth. Which car service places are presented and which types of car service are emphasized is based on the static ranking of the results as described. It is well known that companies specialize in helping web site owners improve their static rankings, effectively attempting to "game" the static rankers into placing a particular website higher in the rankings. Thus, the results that will be placed on the results page are those that owners have modified to score higher and those that are more popular.

As an example, the query "car servicing" will result where high static ranked search will be presented to the user. For example, results that are relevant to the query may include:
A selection of businesses that provide car servicing;
Wikipedia entries that describe what servicing means;
A variety of videos showing various car servicing procedures;
Paid advertising that relate to car servicing;
Service manuals for various vehicles;
Service schedules for various vehicles;
Car dealerships;
Auto parts suppliers; and
Other related results.

These will be static ranked and presented to the user. The selected results will be the highest ranked selections, which may or may not be relevant to what the user is actually trying to locate. For example, if the user is from outside the area and is attempting to locate a place to have warrantee repairs completed, the user may not initially find what they are looking for.

Using the mechanisms described herein, information that is more relevant to what the user is looking for can be presented, thus indicating an increase in whole page relevance. For example, suppose the following features have been gathered with the user's knowledge and consent and placed into the IoT entity index:
Audi, Q5, 2017, 10,763 miles (e.g., the user's car make, model, year, and mileage);
Amazon, Echo, 2016 (e.g., the user's home automation hub make, model, and year of manufacture);
Trend Insights, Lynx, 2015 (e.g., the user's home security camera make, model, and year of manufacture);
Rachio, Rachio 3 (e.g., the user's smart sprinkler system make and model).

As the static ranked search results are re-ranked and positioned by the IoT enhanced ranking and positioning mechanisms disclosed herein, the system can increase the ranking and positioning of results by accounting for the IoT information. For example, the feature generator in the IoT enhanced ranker can select as features those related to the user's car: (make, model, year, miles). The values (Audi, Q5, 2017, 10,763 miles) can then be used as feature vectors for the relevant search results to derive placement scores for the results. Thus, the trained machine learning model can identify higher placement for results like Audi dealers, the type of service related to the number of miles on the car, locations where warranty service can be performed, and so forth. Thus, the system is able to improve the whole page relevance for the results presented to the user.

Example Machine Architecture and Machine-Readable Medium

Figure 11:
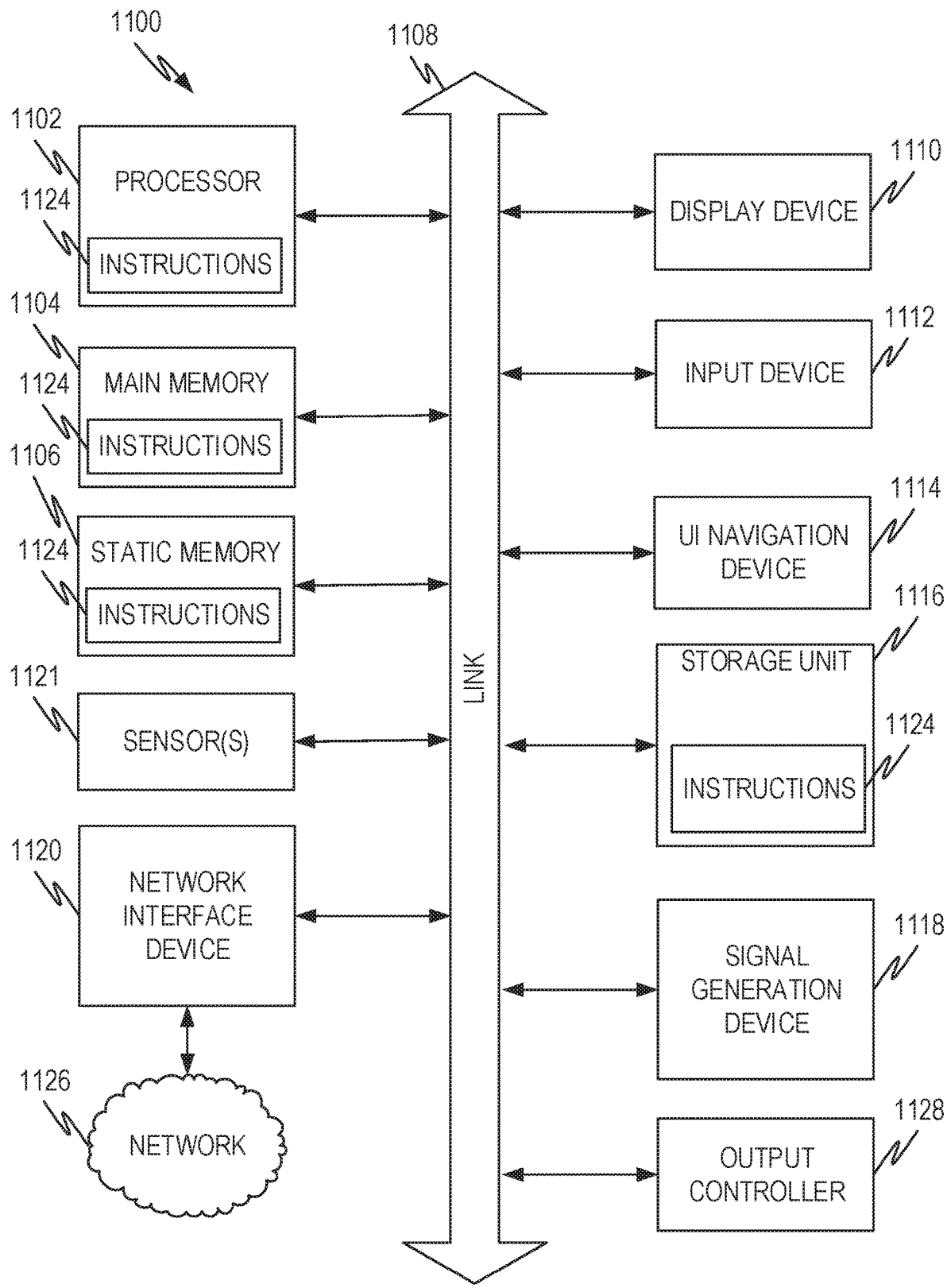
FIG. 11 illustrates a representative machine architecture suitable for implementing the systems and other aspects disclosed herein or for executing the methods disclosed herein.

FIG. 11 illustrates a representative machine architecture suitable for implementing the systems and other aspects disclosed herein or for executing the methods disclosed herein. The machine of FIG. 11 is shown as a standalone device (such as the mobile devices described herein), which is suitable for implementation of the concepts above. For the server and/or services aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 11 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1100 includes at least one processor 1102 (e.g., a central processing unit (CPU), a graphics processing unit (GPU), advanced processing unit (APU), or combinations thereof), one or more memories such as a main memory 1104, a static memory 1106, or other types of memory, which communicate with each other via link 1108. Link 1108 may be a bus or other type of connection channel. The machine 1100 may include further optional aspects such as a graphics display unit 1110 comprising any type of display. The machine 1100 may also include other optional aspects such as an alphanumeric input device 1112 (e.g., a keyboard, touch screen, and so forth), a user interface (UI) navigation device 1114 (e.g., a mouse, trackball, touch device, and so forth), a storage unit 1116 (e.g., disk drive or other storage device(s)), a signal generation device 1118 (e.g., a speaker), sensor(s) 1121 (e.g., global positioning sensor, accelerometer(s), microphone(s), camera(s), an eye tracking subsystem, and so forth), output controller 1128 (e.g., wired or wireless connection to connect and/or communicate with one or more other devices such as a universal serial bus (USB), near field communication (NFC), infrared (IR), serial/parallel bus, etc.), and a network interface device 1120 (e.g., wired and/or wireless) to connect to and/or communicate over one or more networks 1126.

Rather than the more conventional microprocessor, Neural Network chips can be used to implement embodiments of the present disclosure. Neural Network chips are specialized chips designed to execute various forms of neural networks and can be used in the MRC models or other machine learning models that are utilized in the embodiments. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1. A computer implemented method, comprising:
 receiving a set of search results from a search engine that have been determined to be relevant to a search query associated with a user;
 obtaining features associated with Internet of Things (IoT) devices associated with the user;
 determining a positioning score associated with each result in a subset of the set of search results;
 assigning a location on a search results page to each result in the subset based on the positioning score; and
 causing display of the search results page to the user.

Example 2. The method of example 1 wherein determining the positioning score is performed using a trained machine learning model.

Example 3. The method of example 2 wherein the trained machine learning model is trained using the features associated with the IoT devices.

Example 4. The method of example 1 wherein the features associated with each IoT device comprises at least one of:
 one or more properties associated with the IoT device;
 one or more attributes associated with the IoT device; and
 data collected from the IoT device.

Example 5. The method of example 1 further comprises:
 prior to causing display of the search results page, classifying each result in the subset using a second trained machine learning model to assign each result in the subset a final position in the search page.

Example 6. The method of example 5 wherein the second trained machine learning model is trained using features of the IoT devices.

Example 7. The method of example 6 wherein the features associated with the IoT devices comprise at least one of:
 one or more properties associated with the IoT device;
 one or more attributes associated with the IoT device; and
 data collected from the IoT device.

Example 8. The method of example 1 wherein assigning the location on the search results page to each result in the subset comprises:
 when the score associated with a result is lower than a first threshold, dropping the result;
 when the score associated with the result is between the first threshold and a second threshold, locating the result at the bottom of the page;
 when the score associated with the result is between the second threshold and a third threshold, locating the result in the middle of the page; and
 when the score associated with the result is above the third threshold, locating the result at the top of the page.

Example 9. The method of example 1 wherein assigning the location on the search results page to each result in the subset comprises assigning results to multiple areas on the search results page.

Example 10. A system comprising:
a processor and device-storage media having executable instructions which, when executed by the processor, implement visual intent classification, visual intent detection, or both, comprising:
receiving a set of search results from a search engine that have been determined to be relevant to a search query associated with a user;
obtaining features associated with Internet of Things (IoT) devices associated with the user;
determining a positioning score associated with each result in a subset of the set of search results;
assigning a location on a search results page to each result in the subset based on the positioning score; and
causing display of the search results page to the user.

Example 11. The system of example 10 wherein determining the positioning score is performed using a trained machine learning model.

Example 12. The system of example 11 wherein the trained machine learning model is trained using the features associated with the IoT devices.

Example 13. The system of example 10 wherein the features associated with each IoT device comprises at least one of:
one or more properties associated with the IoT device;
one or more attributes associated with the IoT device; and
data collected from the IoT device.

Example 14. The system of example 10 further comprises:
prior to causing display of the search results page, classifying each result in the subset using a second trained machine learning model to assign each result in the subset a final position in the search page.

Example 15. The system of example 14 wherein the second trained machine learning model is trained using features of the IoT devices and wherein the features of the IoT devices comprise at least one of:
one or more properties associated with the IoT device;
one or more attributes associated with the IoT device; and
data collected from the IoT device.

Example 16. A computer implemented method, comprising:
receiving a set of search results (206, 208, 210, 212, 316, 502, 604) from a search engine (204, 314) that have been determined to be relevant to a search query associated with a user, each result having a static ranking score;
obtaining features associated with Internet of Things (IoT) devices (302) associated with the user;
determining a positioning score associated with each result in a subset of the set of search results (616, 802);
assigning a location on a search results page to each result in the subset based on the positioning score (804, 806, 808, 910); and
causing display of the search results page to the user (1016).

Example 17. The method of example 16 wherein determining the positioning score is performed using a trained machine learning model.

Example 18. The method of example 17 wherein the trained machine learning model is trained using the features associated with the IoT devices.

Example 19. The method of example 16, 17, or 18 wherein the features associated with each IoT device comprises at least one of:
one or more properties associated with the IoT device;
one or more attributes associated with the IoT device; and
data collected from the IoT device.

Example 20. The method of example 16, 17, 18, or 19 further comprises:
prior to causing display of the search results page, classifying each result in the subset using a second trained machine learning model to assign each result in the subset a final position in the search page.

Example 21. The method of example 20 wherein the second trained machine learning model is trained using features of the IoT devices.

Example 22. The method of example 21 wherein the features associated with the IoT devices used to train the second machine learning model comprise at least one of:
one or more properties associated with the IoT device;
one or more attributes associated with the IoT device; and
data collected from the IoT device.

Example 23. The method of example 16, 17, 19, 20, 21, or 22 wherein assigning the location on the search results page to each result in the subset comprises:
when the score associated with a result is lower than a first threshold, dropping the result;
when the score associated with the result is between the first threshold and a second threshold, locating the result at the bottom of the page;
when the score associated with the result is between the second threshold and a third threshold, locating the result in the middle of the page; and
when the score associated with the result is above the third threshold, locating the result at the top of the page.

Example 24. The method of example 16, 17, 19, 20, 21, 22, or 23 wherein assigning the location on the search results page to each result in the subset comprises assigning results to multiple areas on the search results page.

Example 25. The method of example 16, 17, 19, 20, 21, 22, or 24 wherein assigning the location on the search results page to each result in the subset comprises:
when the score associated with a result is lower than a first threshold, dropping the result;
when the score associated with the result is between the first threshold and a second threshold, locating the result at the bottom of the page;
when the score associated with the result is between the second threshold and a third threshold, locating the result in the middle of the page; and
when the score associated with the result is above a forth threshold, locating the result at the top of the page.

Example 26. The method of example 16, 17, 19, 20, 21, 22, 23, 24 or 25 wherein assigning the location on the search results page to each result in the subset comprises:
when the score associated with a result is equivalent to a value, ignoring the positioning score and using the static rank to position the result.

Example 27. The method of example 16, 17, 19, 20, 21, 22, 23, 24, 25 or 26 wherein assigning the location on the search results page is performed by a third trained machine learning model.

Example 28. The method of example 16, 17, 19, 20, 21, 22, 24, or 27 wherein assigning the location on the search results page to each result in the subset comprises:
when the score associated with a result is equivalent to a value, ignoring the positioning score and using the static rank score to position the result.

Example 29. An apparatus comprising means to perform a method as in any preceding example.

Example 30. Machine-readable storage including machine-readable instructions, when executed, to implement a method or realize an apparatus as in any preceding example.

Conclusion

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computing system comprising:
a processor; and
memory that stores instructions that, when executed by the processor, causes the processor to perform acts comprising:
obtaining, by a computing device, a set of ranked search results that have been determined to be relevant to a search query set forth by a user;
obtaining Internet of Things (IoT) device data, wherein the IoT device data is extracted from one or more IoT devices;
generating an IoT entity index based upon the IoT device data and additional information obtained from a knowledge index;
extracting a feature value from an entry in the IoT entity index based upon the query, the entry in the IoT entity index comprising IoT device data pertaining to an entity associated with the user, the feature value extracted based upon a category of the entity being identified as relevant to the query;
providing, as input into a trained machine learning model configured to determine a positioning score for a first search result in the set of ranked search results:
a rank of the first search result in the set of ranked search results;
the query; and
the feature value extracted from the entry in the IoT entity index based upon the query; and
causing display of a search results page to the user, wherein a position of the first search result on the search results page is based upon the positioning score obtained as output of the trained machine learning model, wherein the first search result is indicative of an IoT device associated with the user.

2. The computing system of claim 1, wherein the IoT entity index comprises data indicative of a frequency with which the user interacts with the entity, wherein further the determining the positioning score is based upon the frequency with which the user interacts with the entity.

3. The computing system of claim 1, wherein the IoT entity index comprises data indicative of a most recent time at which the user interacted with the entity, wherein further the determining the positioning score is based upon the most recent time at which the user interacted with the entity.

4. The computing system of claim 1, wherein the IoT entity index comprises data indicative of a duration for which the user has interacted with the entity, wherein further the determining the positioning score is based upon the duration for which the user has interacted with the entity.

5. The computing system of claim 1, wherein the entry in the IoT entity index comprises sensor data indicative of a state of the entity.

6. The computing system of claim 1, wherein the IoT entity index further comprises IoT device data pertaining to entities associated with additional users other than the user, and wherein further extracting the feature value comprises:
identifying a subset of entries in the IoT entity index that include IoT device data pertaining to entities associated with the user, the entry included in the subset of entries; and
extracting the feature value from the entry in the IoT entity index based further upon the entry being included in the identified subset of entries.

7. The computing system of claim 1, wherein the entry in the IoT entity index further comprises a relevance score pertaining to the entity associated with the user, wherein determining the positioning score is based further upon the relevance score pertaining to the entity.

8. A method, comprising:
obtaining, by a computing device, a set of ranked search results that have been determined to be relevant to a search query set forth by a user;
obtaining Internet of Things (IoT) device data, wherein the IoT device data is extracted from one or more IoT devices;
generating an IoT entity index based upon the IoT device data and additional information obtained from a knowledge index;
extracting a feature value from an entry in the IoT entity index based upon the query, the entry in the IoT entity index comprising IoT device data pertaining to an entity associated with the user, the feature value extracted based upon a category of the entity being identified as relevant to the query;
providing, as input into a trained machine learning model configured to determine a positioning score of a first search result in the set of ranked search results:
a rank of the first search result in the set of ranked search results;
the query; and
the feature value extracted from the entry in the IoT entity index based upon the query; and
causing display of a search results page to the user, wherein a position of the first search result on the search results page is based upon the positioning score obtained as output of the trained machine learning model, wherein the first search result is indicative of an IoT device associated with the user.

9. The method of claim 8, wherein determining the positioning score of the first search results comprises:
providing the rank of the first search result, the query, and the extracted feature value to a machine learning model that is trained to output the positioning score responsive to receipt of the rank of the first search result, the query, and the extracted feature value.

10. The method of claim 8, further comprising:
receiving updated IoT device data from the entity associated with the user; and
updating the feature value of the entry in the IoT entity index based upon the updated IoT device data.

11. The method of claim 8, wherein the feature value is a first feature value and the entry is a first entry, wherein generating the IoT entity index comprises:
receiving IoT data pertaining to multiple IoT devices associated with the user, wherein the IoT data comprises the first feature value and a second feature value;

matching the first feature value in the IoT data to a first entity name based upon an index of entities;

creating the first entry for the first entity name such that the first entry includes the first feature value;

matching the second feature value in the IoT data to a second entity name based upon the index of entities; and creating a second entry for the second entity name such that the second entry includes the second feature value.

12. The method of claim 11, wherein generating the IoT entity index comprises assigning a label to the first feature value based upon a knowledge index, wherein the label indicates that the first feature value pertains to a first feature type.

13. The method of claim 12, wherein the first feature type is at least one of the category of the entity, a brand of the entity, or a model of the entity.

14. The method of claim 11, wherein the first entry further includes a third feature value, wherein the first entry further comprises a label that indicates that the third feature value has a child relationship with respect to the first feature value.

15. The method of claim 8, further comprising:

responsive to receipt of additional IoT device data from the entity associated with the user, updating the entry in the IoT entity index to include the additional IoT device data.

16. The method of claim 8, wherein the first search result is positioned in a first region of the search results page based upon the positioning score, the method further comprising:

determining a second positioning score for the first search result, wherein a location of the first search result within the first region of the search results page is based upon the second positioning score.

17. A computer-readable storage medium that stores instructions that, when executed by a processor, cause the processor to perform acts comprising:

receiving a set of ranked search results that have been determined by a search engine to be relevant to a search query set forth by a user and provided to the search engine;

obtaining Internet of Things (IoT) device data, wherein the IoT device data is extracted from one or more IoT devices;

generating an IoT entity index based upon the IoT device data and additional information obtained from a knowledge index;

extracting a feature value from an entry in the IoT entity index based upon the query, the entry in the IoT entity index comprising IoT device data that pertains to an entity associated with the user, the feature value extracted based upon a category of the entity being identified as relevant to the query;

providing, as input into a trained machine learning model configured to determine a positioning score for a first search result in the set of ranked search results:

a rank of the first search result in the set of ranked search results;

the query; and the feature value extracted from the entry in the IoT entity index; and causing display of a search results page to the user, wherein a position of the first search result on the search results page is based upon the positioning score obtained as output of the trained machine learning model, wherein the first search result is indicative of an IoT device associated with the user.

18. The computer-readable storage medium of claim 17, wherein the position of the first search result is based further upon a type of the first search result.

19. The computer-readable storage medium of claim 18, wherein the type of the first search result is one of:

image results;

video results;

web page results;

shopping-related results;

maps-related results;

or news-related results.

20. The computer-readable storage medium of claim 17, wherein the extracting the feature value is based upon output of a machine learning model that is trained to receive queries as input and to identify features in the IoT entity index pertaining to the queries.

* * * * *